(12) United States Patent
Weiberle et al.

(10) Patent No.: US 7,040,721 B2
(45) Date of Patent: May 9, 2006

(54) DEVICE AND METHOD FOR ADJUSTING THE PEDAL CHARACTERISTIC CURVE OF A HYBRID BRAKING SYSTEM DURING MODIFIED BRAKING-FORCE DISTRIBUTION

(75) Inventors: Reinhard Weiberle, Vaihingen/Enz (DE); Frank Schumann, Boennnigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/838,277

(22) Filed: May 3, 2004

(65) Prior Publication Data
US 2005/0017574 A1 Jan. 27, 2005

(30) Foreign Application Priority Data
May 2, 2003 (DE) .............................. 103 19 663

(51) Int. Cl.
B60T 8/60 (2006.01)
(52) U.S. Cl. ..................... 303/155; 303/113.4
(58) Field of Classification Search .................. 303/3, 303/15, 20, 152, 155, 186, 114.1, 114.3, 113.4, 303/115.1
See application file for complete search history.

(56) References Cited

U.S. PATENT DOCUMENTS

| | | | | |
|---|---|---|---|---|
| 4,560,210 A * | 12/1985 | Tani et al. | | 303/22.1 |
| 4,824,186 A * | 4/1989 | Leiber et al. | | 303/114.2 |
| 5,496,099 A * | 3/1996 | Resch | | 303/114.1 |
| 5,632,534 A * | 5/1997 | Knechtges | | 303/152 |
| 6,021,365 A * | 2/2000 | Ishii et al. | | 701/22 |
| 6,270,172 B1 * | 8/2001 | Shirai et al. | | 303/152 |
| 6,325,469 B1 * | 12/2001 | Carson et al. | | 303/140 |
| 6,598,943 B1 * | 7/2003 | Harris | | 303/113.4 |
| 6,837,552 B1 * | 1/2005 | Reuter et al. | | 303/122.09 |

* cited by examiner

*Primary Examiner*—Chris Schwartz
(74) *Attorney, Agent, or Firm*—Kenyon & Kenyon, LLP

(57) ABSTRACT

A braking system for a vehicle is described, including a hydraulic service braking system and an electric service braking system having wheel brakes, to which braking pressure is applied when a brake pedal is operated. To maintain essentially constant vehicle braking behavior during a change in the braking-force distribution between the hydraulic and the electric service braking systems, it is proposed to provide a control unit, which is capable of varying the braking-force distribution and to equip the hydraulic service braking system with a braking pressure modulator that is controlled by the control unit and is able to effect a variable braking-force distribution as a function of the control by the control unit.

7 Claims, 2 Drawing Sheets

DEVICE AND METHOD FOR ADJUSTING THE PEDAL CHARACTERISTIC CURVE OF A HYBRID BRAKING SYSTEM DURING MODIFIED BRAKING-FORCE DISTRIBUTION

FIELD OF THE INVENTION

The present invention relates to a device for adjusting the pedal characteristic curve of a hybrid braking system, and to a corresponding method.

BACKGROUND INFORMATION

Hybrid braking systems for motor vehicles normally include a hydraulic service braking system and an electrically operated service braking system, such as an electrohydraulic brake (EHB) or an electromechanical brake (EMB). The hydraulic service braking system is usually assigned to the front axle and the electrically operated service braking system is usually assigned to the rear axle of the vehicle.

When the brake pedal is operated, the braking force applied by the driver is boosted by a brake booster (vacuum brake booster) located in the hydraulic service braking system and a correspondingly increased braking pressure is applied to the brakes of the hydraulic system. The driver's braking wish is also measured by a sensor (braking value sensor) and the corresponding braking value is supplied to a controller, which activates the brakes of the electric service braking system under consideration of the predetermined braking-force distribution.

In certain driving situations, for instance when the vehicle is heavily loaded or when traveling up or down inclines, it may be helpful to adjust the braking-force distribution between the front and rear axles, to adapt the braking behavior optimally to the prevailing conditions. It is known to change the braking-force distribution by increasing or reducing the braking force in the electrically operated service braking system However, this affects the braking behavior of the vehicle, since this changes the total braking force. When the portion of the total braking force that is applied via the electrically operated service braking system is increased, for example from 30% to 50%, the total braking force also increases (during the same brake pedal operation). This means that the vehicle will respond differently to the application of the same pedal force or the brake pedal operation during the same pedal travel. This significantly impairs driving safety, since the driver must constantly adjust to changes in braking behavior.

SUMMARY OF THE INVENTION

An object of the present invention is therefore to provide a device and a method via which the braking behavior of the vehicle, i.e., the total braking force, may be kept essentially constant as a function of the pedal travel and/or the force applied to the pedal.

According to the present invention, a control unit is provided that is capable of individually adjusting the braking forces applied in both the hydraulic and the electrical service braking systems and thus of varying the braking-force distribution by increasing or reducing the braking pressure in both systems. The braking force in the electrical braking system is adjusted by correspondingly controlling an electromechanical actuating element. In order to adjust the braking pressure in the hydraulic service braking system, this includes a controllable braking pressure modulator, which boosts the braking force applied to the brake pedal as a function of control by the control unit. The driver's braking wish is recorded by a suitable sensor and supplied to the control unit as a setpoint value for the total braking torque. The control unit then adjusts the desired total braking force by controlling both the braking pressure modulator and the electromechanical actuating element on the basis of the predetermined braking-force distribution. The braking pressure modulator has the advantage that the braking pressure acting on the hydraulic brakes may be varied largely independently of the force applied to the pedal by the driver. In this way, it is possible to maintain an essentially constant ratio between the pedal force and the total braking force even when the braking-force distribution is changed.

According to a preferred embodiment of the present invention, the control unit controls the braking pressure modulator in such a way that the ratio between the pedal force and the total braking torque setpoint value remains essentially constant. This means that the same force applied in operating the brake pedal always creates the same total braking torque regardless of the braking-force distribution adjustment between the front and rear axles. As a result, the driver does not need to make any adjustments.

According to a further embodiment of the present invention, a device is provided in the hydraulic service braking system via which the pedal characteristic curve, i.e., the ratio between the pedal travel and the effective braking pressure on the hydraulic brakes, may be adjusted. As a result, corresponding controlling by the control unit allows an essentially constant ratio between the brake pedal position and the braking torque acting on the total braking system to be maintained.

Using the braking pressure modulator and the device for varying the pedal characteristic curve, it is possible to keep the braking behavior essentially constant relative to the pedal force and the pedal travel even when the braking-force distribution is changed.

According to a first embodiment of the present invention, the braking pressure modulator includes a controllable brake booster, such as a vacuum brake booster, the boost level of which may be adjusted by the control unit. To set various boost levels, the brake booster may include a controllable valve, for instance, via which the degree of aeration of a working chamber may be varied according to the control.

According to a second embodiment of the present invention, the braking pressure modulator includes a controllable hydraulic unit that is capable of raising or lowering the braking pressure depending on a control by the control unit. Such hydraulic units are known for instance from ASR or ESP systems. As a rule, hydraulic units include controllable hydraulic pumps and valves that may be actuated according to a predetermined algorithm. Such a hydraulic unit is thus also suitable for use as a braking pressure modulator within the scope of the present invention.

The braking system according to the present invention may also include additional braking systems, such as regenerative braking systems, which are preferably also controlled in such a way that the ratio between the pedal force and/or pedal travel and the total braking torque remains constant even when the braking-force distribution is changed.

DETAILED DESCRIPTION

Figure 1:
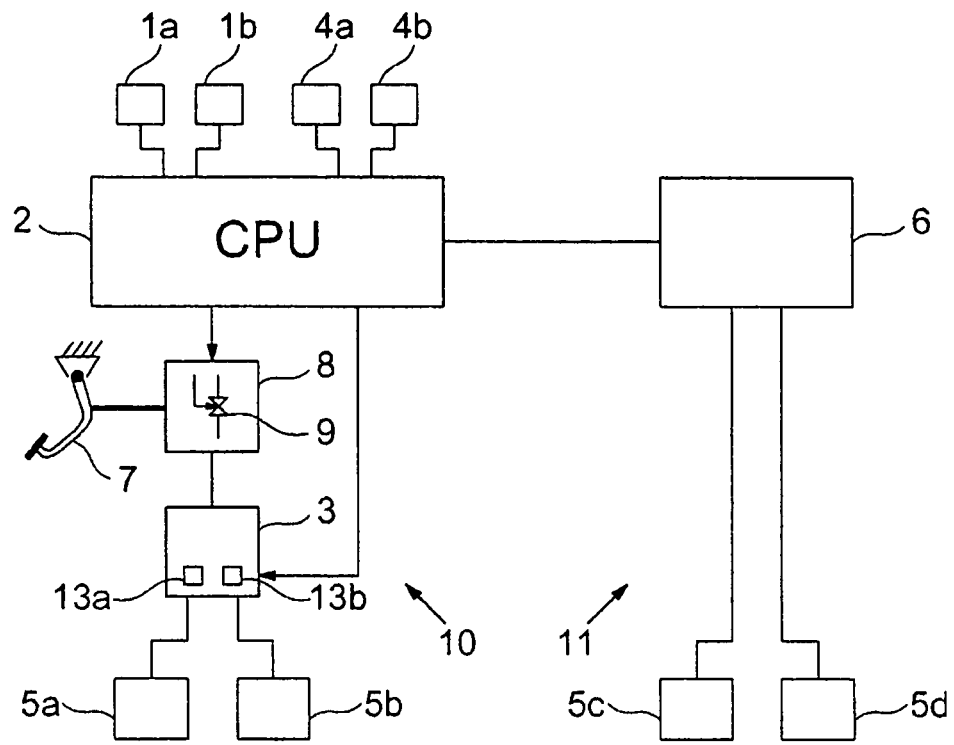
FIG. 1 shows a schematic representation of a hybrid braking system having a controllable braking pressure modulator according to a first embodiment of the present invention.

FIG. 1 shows a schematic representation of a hybrid braking system having a purely hydraulic service braking system 10 and an electrically operated service braking system 11, such as an electromechanical braking system (EMB). In this case, hydraulic service braking system 10 is assigned to the front axle including wheel brakes 5a, 5b, and electric service braking system 11 is assigned to the rear axle including wheel brakes 5c, 5d.

Braking pressure as a function of the driver's braking wish is applied to hydraulic wheel brakes 5a, 5b by a first control unit 2, and to electromechanical wheel brakes 5c, 5d by a second, separate control unit 6. However, a single, universal control unit may optionally be provided.

In the configuration shown, including two control units 2, 6, control unit 2 is preferably tasked with all functions regarding total braking system 10, 11, e.g., detecting a brake operation (of the service brake or the parking brake), and determines the braking-force distribution and superior braking control functions (ABS, ESP). In contrast, control unit 6 is used essentially only to control electromechanical brakes 5c, 5d on the basis of signals received from main control unit 2.

The braking system further includes a braking pressure modulator 8, which is included in hydraulic service braking system 10 and is controlled by control unit 2. A desired braking-force distribution may be set as a function of the control. In the embodiment shown in FIG. 1, the braking pressure modulator includes among other components a vacuum brake booster 8, which is equipped with a controllable valve 9 for aerating a working chamber. Valve 9 may be controlled by control unit 2 for varying the boost level of brake booster 8.

Control unit 2 is able to vary the braking-force distribution between the front and rear axles depending on a predefined condition, in particular a prevailing driving situation. Such a condition may be, for example, the gradient of the road, the vehicle load, wheel slip, etc. The braking-force distribution is preferably adjusted in such a way that the vehicle demonstrates optimum braking behavior with respect to the driving situation. Thus, for example, a greater proportion of the braking force may be directed to the rear axle when the vehicle is heavily loaded, provided that the vehicle's center of gravity is low. However, if the center of gravity is high, more braking force must be directed to the front axle. The weight of the load may be determined, for example, from the suspension travel of the vehicle. The position of the load and thus also the vehicle's center of gravity may be determined using appropriate sensors, for example, via the roll angle during cornering or the pitch angle in a braking maneuver of the vehicle.

The driver's braking wishes are recorded by sensors 1a, 1b and 4a, 4b, respectively. Sensors 1a, 1b detect operation of the brake pedal, and sensors 4a, 4b detect operation of the parking brake. Sensors 1a, 1b, 4a, 4b are configured redundantly for safety reasons. Sensors 1a, 1b are pressure, angle, or travel sensors, for example.

Hydraulic service braking system 10 further includes a device 13a, 13b for adjusting the pedal characteristic curve, i.e., for adjusting a ratio between the pedal travel and the braking torque acting on hydraulic brakes 5a, 5b. This may include, for example, controllable valves, via which part of the brake fluid may be diverted, e.g. to a storage reservoir. The valves may optionally be discharge valves of a hydraulic unit, which may be used to reduce the braking pressure.

Control unit 2 is configured in such a way that, regardless of the braking-force distribution between the front and rear axles, the same ratio is established between the pedal travel and/or braking force applied by the driver and the total braking torque applied to wheels 5a–5d by corresponding control of braking pressure modulator 8 or device 13a, 13b for adjusting the pedal characteristic curve. As a result, the same braking behavior for the vehicle with respect to the pedal force or pedal travel may be assured even if the braking-force distribution changes.

Brake booster 8 is preferably implemented in such a way that the wheel braking torque may be adjusted for each wheel individually.

Figure 2:
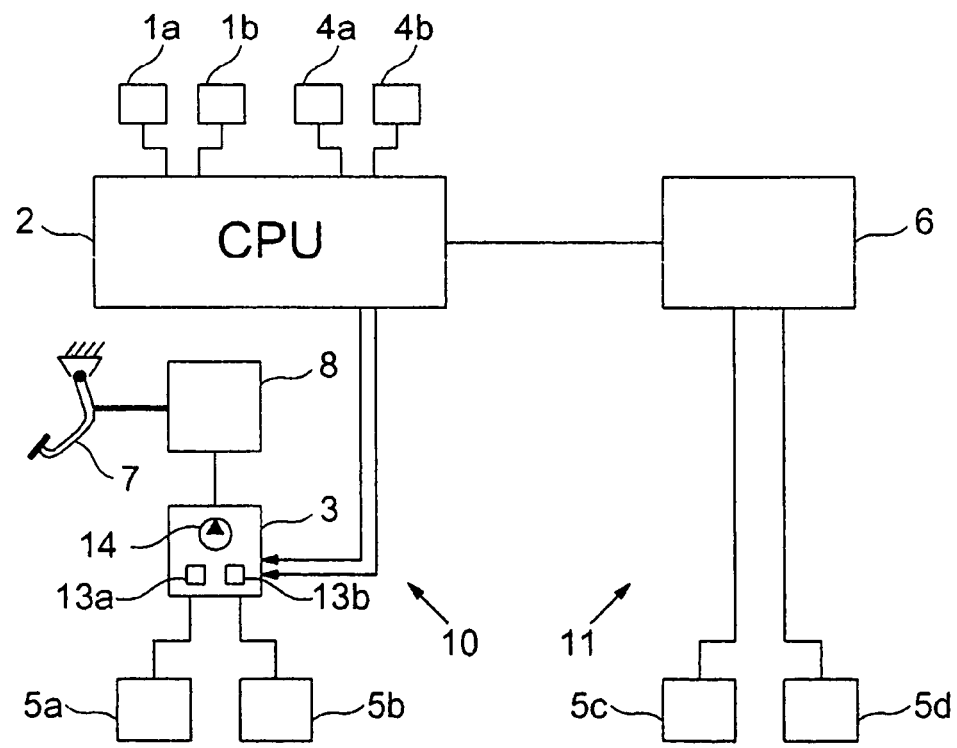
FIG. 2 shows a schematic representation of a hybrid braking system having a controllable braking pressure modulator according to a second embodiment of the present invention.

FIG. 2 shows a brake system having essentially exactly the same configuration as the brake system in FIG. 1. It differs from the one shown in FIG. 1 in that the braking pressure modulator in this case is implemented as a hydraulic unit 3 that is controllable by control unit 2. Hydraulic unit 3 is able to vary the braking pressure applied to hydraulic brakes 5a, 5b as a function of the control by control unit 2. Hydraulic unit 3 may be a component of an ABS or ESP system that is already present in the vehicle.

In order to vary the braking pressure, hydraulic unit 3 includes a hydraulic pump 14 and controllable valves that are controlled by control unit 2. In this way, a desired braking torque may be set for hydraulic brakes 5a, 5b regardless of the braking force applied by the driver.

Controllable hydraulic unit 3 is preferably implemented in such a way that the wheel braking torque may be adjusted for each wheel individually.

Figure 3:
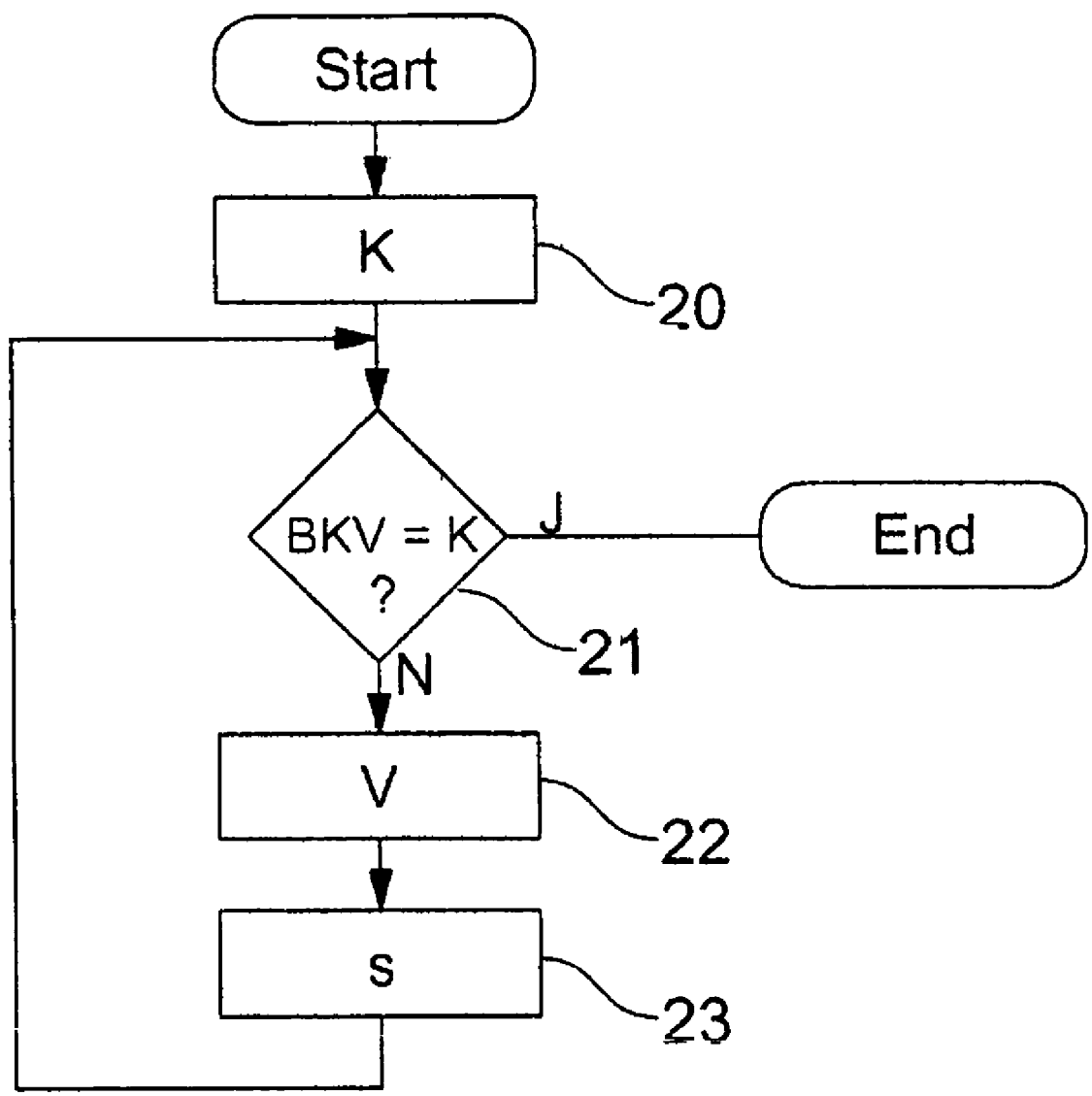
FIG. 3 shows a flow chart illustrating the essential method steps involved in changing the braking-force distribution.

FIG. 3 shows the essential method steps for adjusting a desired braking-force distribution. In step 20, braking-force distribution K is established between the front and rear axles as a function of an instantaneous driving situation, and in step 21 a check is performed to determine whether the instantaneous braking-force distribution already matches the desired setpoint braking-force distribution. If this is not the case (N), the brake booster is varied via a control from braking force modulator 3, 8 and at the same time the braking force acting on electrically operated service braking system 11 is adjusted in such a way that the ratio between the pedal force and the total braking force remains essentially constant (step 22).

Finally, in step 23 the ratio between the pedal travel and the total braking force is adjusted in such a way that it remains constant regardless of the braking-force distribution value. This step is performed iteratively until the braking-force distribution matches the setpoint braking-force distribution (case J in step 22). At this point, the method is completed, and may be repeated for each new driving situation in which a different braking-force distribution is more ideal.

Key:
1*a*, 1*b* Sensor system for service braking wish
2 Control unit for the hydraulic braking system
3 Hydraulic unit
4*a*, 4*b* Sensor system for parking brake wish
5*a*, 5*b* Hydraulic brakes, preferably on the front wheels
5*c*, 5*d* Electric wheel brakes, preferably on the rear wheels
6 Control unit for the EMB
7 Brake pedal
8 Controllable brake booster
9 Controllable valve
10 Hydraulic service braking system
11 Electrically operated service braking system
13*a*, 13*b* Device for adjusting the pedal characteristic curve
14 Hydraulic pump
20–23 Method steps

What is claimed is:

1. A braking system for a motor vehicle, comprising:
   a hydraulic service braking system;
   an electric service braking system including wheel brakes to which braking pressure is applied when a brake pedal is operated;
   a control unit capable of changing a braking-force distribution between the electrical service braking system and the hydraulic service braking system; and
   a braking pressure modulator situated in the hydraulic service braking system for boosting the braking pressure acting on hydraulic brakes, wherein:
      the control unit is able to control an actuating element in the electric service braking system as well as the braking pressure modulator to change the braking-force distribution;
      the hydraulic service braking system includes a device via which a ratio between a pedal travel of the brake pedal and the braking pressure acting on the hydraulic wheel brakes is adjustable; and
      the control unit controls the device for adjusting the pedal travel in such a way that a ratio between the pedal travel and a total braking torque remains essentially constant during a change in the braking-force distribution.

2. The braking system as recited in claim 1, wherein:
   the control unit controls the braking pressure modulator in such away that a ratio between a pedal force and a total braking torque remains essentially constant when the braking-force distribution is changed.

3. The braking system as recited in claim 1, wherein:
   the braking pressure modulator includes an adjustable vacuum brake booster, a boost level of which may is adjustable via the control unit.

4. The brake system as recited in claim 3, wherein:
   the brake booster includes a controllable valve for aerating a working chamber of the brake booster that is controllable by the control unit.

5. The braking system as recited in claim 1, wherein:
   the braking pressure modulator includes a hydraulic unit that is capable of varying the braking pressure acting on the hydraulic brakes as a function of a control by the control unit.

6. The braking system as recited in claim 5, wherein:
   the hydraulic unit includes a controllable hydraulic pump that is controllable by the control unit.

7. A method for operating a braking system, including a hydraulic service braking system and an electric service braking system having wheel brakes, comprising:
   applying a braking pressure to the wheel brakes when a brake pedal is operated; and
   causing a control unit to control a braking pressure modulator situated in the hydraulic service braking system and the electric service braking system in such a way that a ratio between a total vehicle braking torque and at least one of a pedal force and a pedal travel remains essentially constant when a braking-force distribution is changed between the hydraulic service braking system and the electric service braking system;
   wherein the hydraulic service braking system includes a device via which a ratio between a pedal travel of the brake pedal and the pedal pressure acting on the hydraulic wheel brakes is adjustable, and wherein the control unit controls the device for adjusting the pedal travel in such a way that a ratio between the pedal travel and a total braking torque remains essentially constant during a change in the braking-force distribution.

* * * * *